May 21, 1963
H. B. HUMMER ETAL
SEALS FOR STUFFING BOXES AND THE LIKE
PERMITTING FLUSHING THEREOF
Filed Dec. 7, 1960
3,090,320
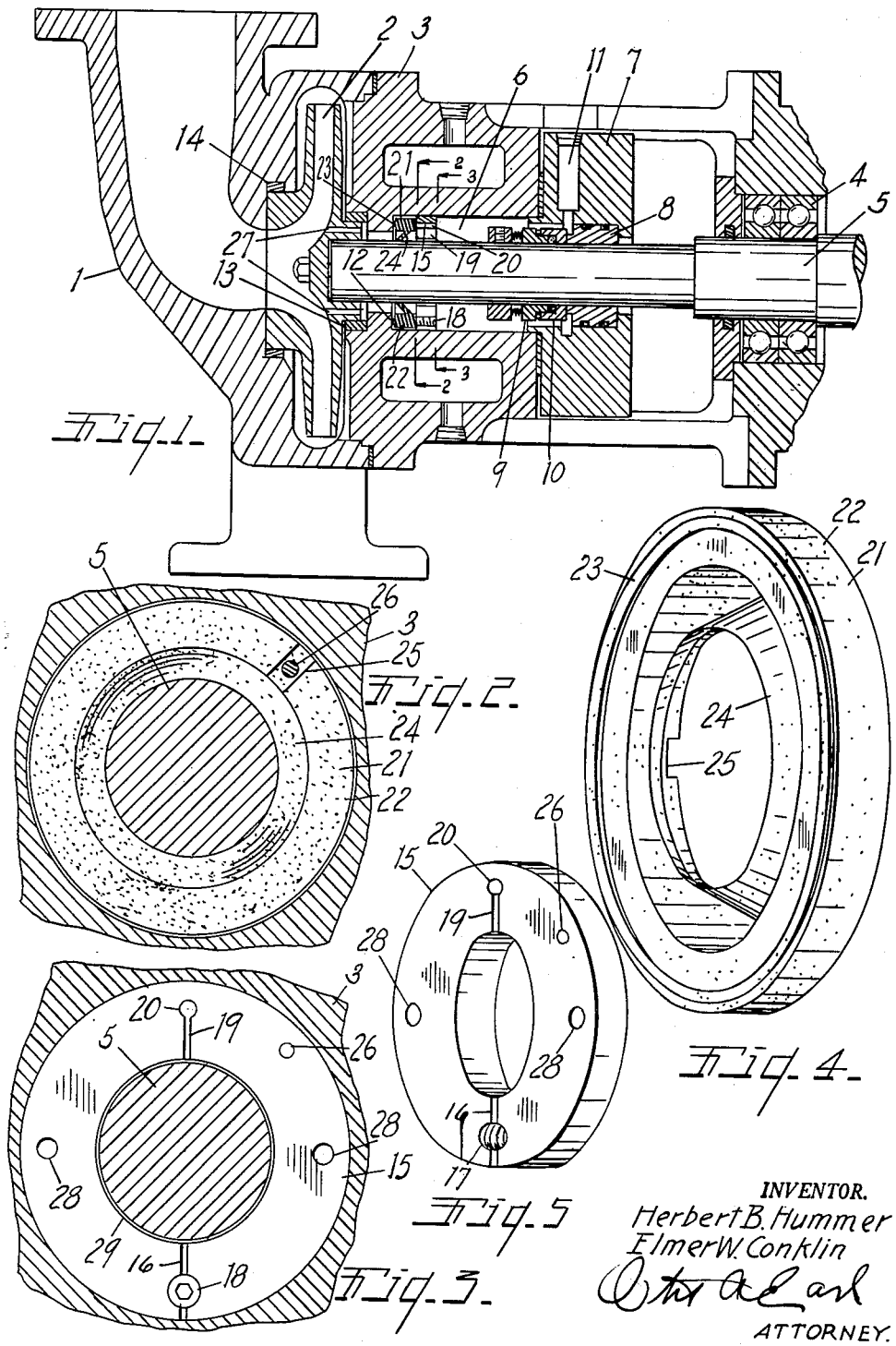
INVENTOR.
Herbert B. Hummer
Elmer W. Conklin
ATTORNEY.

3,090,320
SEALS FOR STUFFING BOXES AND THE LIKE PERMITTING FLUSHING THEREOF
Herbert B. Hummer and Elmer W. Conklin, Kalamazoo, Mich., assignors to Durametallic Corporation, Kalamazoo, Mich.
Filed Dec. 7, 1960, Ser. No. 74,414
11 Claims. (Cl. 103—111)

This invention relates to seal means for pump stuffing boxes and the like, which permits flushing thereof. The main objects of this invention are, First, to provide a seal for stuffing boxes and the like which may be readily adapted to or incorporated in various designs of pumps and the like.

Second, to provide a seal for stuffing boxes which permits flushing thereof and at the same time is effective in minimizing the entrance of flushing fluid material into the stuffing box.

Third, to provide a seal means having these advantages which is very simple and economical in structure and readily installed.

Objects relating to details and economies of the invention will appear from the description to follow. The invention is defined and pointed out in the claims. A preferred embodiment of the invention is illustrated in the accompanying drawing, in which:

FIG. 1 is a fragmentary view of a centrifugal pump structure mainly in vertical longitudinal section embodying our invention, the shaft being shown in full lines.

FIG. 2 is an enlarged fragmentary transverse section on a line corresponding to line 2—2 of FIG. 1.

FIG. 3 is an enlarged fragmentary transverse section on a line corresponding to line 3—3 of FIG. 1.

FIG. 4 is an enlarged perspective view of the seal member of our invention.

FIG. 5 is a perspective view of the seal member anchoring and supporting collar.

In the embodiment of our invention illustrated 1 represents the casing or housing of a centrifugal pump and 2 the rotary impeller thereof. The details of the pump are not further illustrated as such details form no part of our present invention. The housing, designated generally by the numeral 3, constitutes part of the pump housing and is fixedly secured thereto, the details of the connection not being illustrated. The housing 3 constitutes a part of the pump body and is provided with a bearing 4 for the shaft 5, the impeller being mounted on the inner end of the shaft.

The housing 3 is provided with a chamber 6 through which the shaft projects. This chamber 6 is closed by the member 7 which is secured to the housing and constitutes a part thereof in assembled relation thereto. The housing member 7 is chambered to receive the relatively fixed seal member 8 with which the shaft seal unit, designated by the numeral 9, coacts to provide an effective seal for the shaft. The details of this seal are not described as such details form no part of our present invention and the seal illustrated is and has been in commercial use. The inner portion of the seal in this embodiment projects into the chamber 6, but the seal is surrounded by a space designated generally by the numeral 10 into which the inlet passage 11 opens. At the inner end of the chamber 6 is a shoulder 12, the inner edge of which is spaced from the shaft and through which the shaft projects so that the impeller 2 may be mounted on the projecting end thereof.

In the embodiment illustrated a bearing 13 is provided for the impeller but it will be understood that the main load on the shaft is carried by the bearings 4. The bearing 13, however, prevents radial vibrating movement of the shaft. The impeller 2 is also provided with a bearing 14 in the embodiment illustrated, but it should be understood that these bearing parts are conventionally illustrated as there is a wide variation in the types of pumps or the like with which our invention is designed and adapted to be used, and particularly for pumps and the like designed to pump or handle liquid of corrosive character or which includes or carries solids or abrasives of various kinds.

In the embodiment of our invention illustrated the collar 15 has a radial split 16 therein with a threaded bore 17 and the expanding screw 18 is threaded into this threaded bore to expand the collar into retaining engagement with the wall of the chamber 6. To facilitate this expansion the collar 15 is provided with a radial slot 19 opposed to the slit 16 and terminating in a bore 20 which not only facilitates the expansion but acts to minimize fracturing the collar as it is expanded into the chamber.

The seal member 21 is formed of nonmetallic material, Teflon being springably resilient and a desirable material. This comprises an annular body portion 22 having an annular rib 23 on the forward side thereof which is adapted to seat in thrust engagement with the shoulder 12 at the front end of the chamber or the end adjacent the impeller. The member 21 is of somewhat less diameter than the chamber and it is provided with an annular flexibly yielding conical lip 24, which is in sealing engagement with the shaft in normal use operation thereof to prevent entrance of the impelled liquid into the seal chamber, but it is sufficiently yielding to permit water or flushing liquid to be discharged therethrough from the seal chamber. It serves to insure that the flushing liquid is discharged in surrounding relation to the shaft, that is, the opening of this lip to permit the passage of liquid therethrough is uniform throughout. To prevent rotation of the member 21, it is provided with a radial slot 25 on its inner side which receives the anchoring pin 26 on the collar. In the embodiment illustrated, the impeller is provided with bores 27 through its hub which permits the passage of the flushing fluid therethrough into the impeller. To facilitate the positioning of the collar it is desirably provided with tapped recesses 28 on its inner face. It will be understood, however, that these recesses 28 are merely for use in facilitating the assembling and removal and serve no other purpose.

The collar anchoring screw thread 18 is tapered and its internal diameter is such as to provide clearance 29, see FIG. 3, for the shaft and the flushing fluid is discharged through this clearance, and that also serves to guide the flushing fluid entirely around the shaft.

The housing member 7 may be shifted or adjusted to provide access to the chamber 6.

We have illustrated and described our invention in a highly practical commercial embodiment thereof. We have not attempted to illustrate or describe other embodiments or adaptations to particular pumps or the like, as it is believed that this disclosure will enable those skilled in the art to embody or adapt our invention as may be desired.

Having thus described the invention, what is claimed as new and desired to secure by Letters Patent is:

1. A structure of the class described comprising an impeller, a driving shaft therefor, a housing having a cylindrical chamber therein through which said shaft is disposed, there being an inwardly projecting shoulder at the end of said chamber adjacent said impeller, a shaft seal means spaced from said shoulder axially of said shaft, a split annular collar, screw means engaged with the edges of the split of said collar for expanding the collar into clamping engagement with the wall of the chamber, a seal member of springably yieldable plastic supportedly disposed between said collar and said shoulder and comprising an annular body portion having an annular rib-like portion in thrust engagement with said shoulder, said seal member having an integral inwardly projecting flexibly yieldable conical lip disposed in yielding engagement with said shaft and having a radial groove in the inner side thereof, said collar having a lug thereon projecting into said radial slot in said seal member preventing rotative movement thereof, and a flushing liquid inlet opening to said chamber so that the flushing liquid entering flows around said packing and through said collar and said seal member, said lip on said seal member acting to prevent the reverse flow of liquid into said chamber.

2. A structure of the class described comprising an impeller, a driving shaft therefor, a housing having a cylindrical chamber therein through which said shaft is disposed, there being an inwardly projecting shoulder at the end of said chamber adjacent said impeller, a shaft seal means spaced from said shoulder axially of said shaft, a split annular collar, screw means engaged with the edges of the split of said collar for expanding the collar into clamping engagement with the wall of the chamber, a seal member of springably yieldable plastic supportedly disposed between said collar and said shoulder and having an integral inwardly projecting flexibly yieldable conical lip disposed in yielding engagement with said shaft, and a flushing liquid inlet opening to said chamber so that the flushing liquid entering flows around said packing and through said collar and said seal member, said lip on said seal member acting to prevent the reverse flow of liquid into said chamber.

3. A structure of the class described comprising an impeller, a driving shaft therefor, a housing having a cylindrical chamber therein through which said shaft is disposed, there being an inwardly projecting shoulder at the end of said chamber adjacent said impeller, a shaft seal means spaced from said shoulder axially of said shaft, a split annular collar having a radial slot extending from the inner side thereof diagonally opposite the split therein and terminating in a cylindrical bore, screw means engaged wtih the edges of the split of said collar for expanding the collar into clamping engagement with the wall of the chamber, a seal member of springably yieldable plastic supportedly disposed between said collar and said shoulder and having an integral inwardly projecting flexibly yieldable conical lip disposed in yielding engagement with said shaft, and a flushing liquid inlet opening to said chamber so that the flushing liquid entering flows around said packing and through said collar and said seal member, said lip on said seal member acting to prevent the reverse flow of liquid into said chamber.

4. A structure of the class described comprising an impeller, a driving shaft therefor, a housing having a chamber therein through which said shaft is disposed, there being an inwardly projecting abutment at the end of said chamber adjacent said impeller, a shaft seal means spaced from said shoulder, a collar supportedly mounted within said chamber and having a lug projecting axially from the side thereof adjacent said abutment, a seal member of springably yieldable material disposed between said collar in thrust supported sealing engagement with said abutment and having an integral inwardly projecting yieldable conical lip disposed in facing relation to said abutment and in sealing engagement with said shaft when subjected to the pressure of liquid circulated by said impeller, said seal member having a radial slot in the side thereof adjacent said collar, said collar having a lug thereon projecting into said slot thereby preventing rotative movement of said seal member, there being a flushing liquid inlet opening to said chamber at the inner side of said collar and seal member.

5. A structure of the class described comprising an impeller, a driving shaft therefor, a housing having a chamber therein through which said shaft is disposed, there being an inwardly projecting abutment at the end of said chamber adjacent said impeller, a shaft seal means spaced from said shoulder, a collar supportedly mounted within said chamber and having a lug projecting axially from the side thereof adjacent said abutment, a seal member of springably yieldable material disposed between said collar in thrust supported sealing engagement with said abutment and having an integral inwardly projecting yieldable lip disposed in sealing engagement with said shaft when subjected to the pressure of liquid circulated by said impeller, said seal member having a radial slot in the side thereof adjacent said collar, said collar having a lug thereon projecting into said slot thereby preventing rotative movement of said seal member, there being a flushing liquid inlet opening to said chamber at the inner side of said collar and seal member.

6. A structure of the class described comprising an impeller, a driving shaft therefor, a housing having a chamber therein through which said shaft is disposed, there being an inwardly projecting abutment at the end of said chamber adjacent said impeller, a shaft seal means spaced from said shoulder, a collar supportedly mounted within said chamber and having a lug projecting axially from the side thereof adjacent said abutment, a seal member of springably yieldable material disposed between said collar in thrust supported sealing engagement with said abutment and having an integral inwardly projecting yieldable conical lip disposed in facing relation to said abutment and in sealing engagement with said shaft when subjected to the pressure of liquid circulated by said impeller, there being a flushing liquid inlet opening to said chamber at the inner side of said collar and seal member.

7. A structure of the class described comprising an impeller, a driving shaft therefor, a housing having a chamber therein through which said shaft is disposed, there being an inwardly projecting abutment at the end of said chamber adjacent said impeller, a shaft seal means spaced from said shoulder, a collar supportedly mounted within said chamber and having a lug projecting axially from the side thereof adjacent said abutment, a seal member of springably yieldable material disposed between said collar in thrust supported sealing engagement with said abutment and having an integral inwardly projecting yieldable lip disposed in sealing engagement with said shaft when subjected to the pressure of liquid circulated by said impeller, there being a flushing liquid inlet opening to said chamber at the inner side of said collar and seal member.

8. The combination of a housing having a shaft receiving chamber therein, there being an inwardly projecting abutment at one end of said chamber, a shaft disposed in said chamber, said abutment being axially spaced from said shaft, a shaft seal means spaced from said shoulder axially of said shaft, a collar adjustably and fittingly mounted within said chamber and spaced from said shaft to permit the flow of liquid therebetween, a seal member supportedly disposed between said collar and said abutment and comprising an annular body portion having an annular rib-like portion in thrust sealing engagement with said abutment, said seal member having an integral inwardly projecting flexibly yielding conical lip disposed in yielding engagement with said shaft, interengaging means on said seal member and collar preventing rotative movement of said seal member, and a flushing liquid inlet opening to said chamber at the side of said collar opposite said seal member, said lip on said seal member being yieldable to permit the flow of flushing liquid from said chamber but acting to prevent flow of liquid in opposite direction.

9. The combination of a housing having a shaft receiving chamber therein, there being an inwardly projecting abutment at one end of said chamber, a shaft disposed in said chamber, said abutment being axially spaced from said shaft, a shaft seal means spaced from said shoulder axially of said shaft, a collar adjustably and fittingly mounted within said chamber and spaced from said shaft to permit the flow of liquid therebetween, a seal member supportedly disposed between said collar and said abutment in thrust sealing engagement with said abutment, said seal member having an integral inwardly projecting flexibly yielding lip disposed in yielding engagement with said shaft, interengaging means on said seal member and collar preventing rotative movement of said seal member, and a flushing liquid inlet opening to said chamber at the side of said collar opposite said seal member, said lip on said seal member being yieldable to permit the flow of flushing liquid from said chamber but acting to prevent flow of liquid in opposite direction.

10. In combination, a split annular collar having a radial slot extending from the inner side thereof diagonally opposite the split therein and terminating in a cylindrical bore, screw means engaged with the edges of the split of said collar for expanding the collar, and a seal member of resiliently yieldable plastic comprising an annular body portion having a radial groove in its inner side and an integral inwardly projecting flexibly yieldable conical lip, said collar having a lug thereon projecting into said radial groove preventing rotative movement of the seal member relative to said collar when the parts are in assembled use relative to each other.

11. In combination, a split annular collar having a radial slot extending from the inner side thereof diagonally opposite the split therein and terminating in a cylindrical bore, screw means engaged with the edges of the split of said collar for expanding the collar, and a seal member of resiliently yieldable material comprising an annular body portion having a recess in its inner side and an integral inwardly projecting flexibly yieldable lip, said collar having a lug thereon projecting into said recess preventing relative rotative movement of the seal member.

References Cited in the file of this patent

UNITED STATES PATENTS

| | | |
|---|---|---|
| 2,174,075 | Borchardt | Sept. 26, 1939 |
| 2,427,656 | Blom | Sept. 23, 1947 |
| 2,486,928 | Cole | Nov. 1, 1949 |

FOREIGN PATENTS

| | | |
|---|---|---|
| 890,901 | Germany | Oct. 29, 1953 |